Sept. 9, 1969             F. A. RISKY             3,466,402

APPARATUS FOR MONITORING A PREDETERMINED RANGE OF CURRENT

Filed April 26, 1966             2 Sheets-Sheet 1

*INVENTOR.*
FRANK A. RISKY
BY
ATTY.

Sept. 9, 1969  F. A. RISKY  3,466,402

APPARATUS FOR MONITORING A PREDETERMINED RANGE OF CURRENT

Filed April 26, 1966  2 Sheets-Sheet 2

INVENTOR.
FRANK A. RISKY
BY
ATTY.

United States Patent Office 3,466,402
Patented Sept. 9, 1969

3,466,402
APPARATUS FOR MONITORING A PREDETERMINED RANGE OF CURRENT
Frank A. Risky, Cicero, Ill., assignor to Automatic Electric Laboratories, Inc., Northlake, Ill., a corporation of Delaware
Filed Apr. 26, 1966, Ser. No. 545,451
Int. Cl. H04m 3/22
U.S. Cl. 179—18     3 Claims

ABSTRACT OF THE DISCLOSURE

Magnetic apparatus for monitoring the current status in a circuit, wherein a control winding, which in the prefered embodiment comprises a pair of separate sections, is serially connected thereto and mounted within a cup core of linear magnetic material. The cup core is formed by two cup-shaped members having cylindrical portions abutting each other at their open ends, with one of the cylindrical portions having cutouts adjacent the open end to form a plurality of legs for concentrating the flux paths between the cylindrical portions when current flows in the circuit. A pair of apertures formed in one of the legs are threaded with two conductive loops, one being connected to a signal generator and the other to a detector circuit. In this manner two perpendicular non-remanent flux paths are established within the structure of the apparatus. Whenever the current flow in the circuit is of sufficient value to cause the sections of the control winding to create a magnetic saturation of the device, the signal source is decoupled from the detector circuit, whereby the presence or absence of an output from the detector is directly related to the magnitude of the current flow in the monitored circuit.

This invention relates to current monitoring apparatus and in particular to such apparatus that employs magnetic saturation to effect the monitoring function.

Apparatus that employs magnetic saturation effects as the basis for monitoring current flow in a circuit is known in the art and has been shown, for instance, in U.S. Patent 3,175,042, and also in the application of J. G. Van Bosse, Ser. No. 523,365 filed Jan. 27, 1966, and assigned to the assignee of this application.

In this preior art type of apparatus the monitoring function is based on the principle of coupling a signal to or decoupling it from a detector circuit in a direct relation to the magnitude of the current flowing in the monitored circuit. The apparatus uses an elongated magnetic element as the coupling medium. A winding serially connected to the circuit being monitored, is wound on the magnetic element and whenever current in the winding reaches a predetermined level, the element becomes saturated and causes the signal generator to be decoupled from the detector circuit.

Apparatus of this type may be used in matrix arrays for monitoring a number of circuits at a time. The operation of the device shown in U.S. Patent 3,175,042 requires that a large portion of the flux exist in the air around each element, and caution must be taken to prevent the effects of magnetic interaction between elements mounted adjacent one another.

In view of the rod shape of the elements, difficulty may be encountered in the assembly of the sensing device. In addition, the threading of the apertured elements with conductors can cause a buildup of mechanical stresses which are a potential hazard to reliability.

It is therefore, an object of this invention to provide a new and improved current monitoring device.

It is another object of this invention to provide a magnetic sensing device that is easily fabricated and assembled.

It is yet another object of this invention to provide a new and improved method for shielding a magnetic sensing device from magnetic interaction when used in a matrix array.

It is a feature of the invention that a control winding used to saturate a magnetic structure is contained substantially within the magnetic structure.

It is another feature of the invention that a portion of the magnetic return path is used to provide the medium for inductively coupling the output of a signal generator to a detecting circuit.

It is yet another feature of the present invention that the sensitivity of the device is adjustable.

In accordance with a preferred embodiment of the invention, apparatus for monitoring the status of current in a circuit includes a two-piece magnetic structure having a core and a magnetic return path, and providing two mutually perpendicular non-remanent flux paths closed within the structure itself. A multi-turn control winding, which in the preferred embodiment comprises a pair of separate sections, is mounted on the core and is contained within the magnetic structure and gives rise to one of the flux paths. The control winding is included in the circuit being monitored for saturating the magnetic structure whenever the magnitude of the current exceeds a predetermined value.

A portion of the magnetic return path includes apertures through which are threaded a pair of conductive loops which share the other flux path and whenever the magnetic structure is unsaturated, a signal applied to one of the loops is coupled to the other loop, with the magnetic material in the vicinity of the apertures acting as the coupling medium.

The invention together with its objects and features will best be understood by referring to the following detailed description, together with the accompanying drawings, in which.

Figure 1:
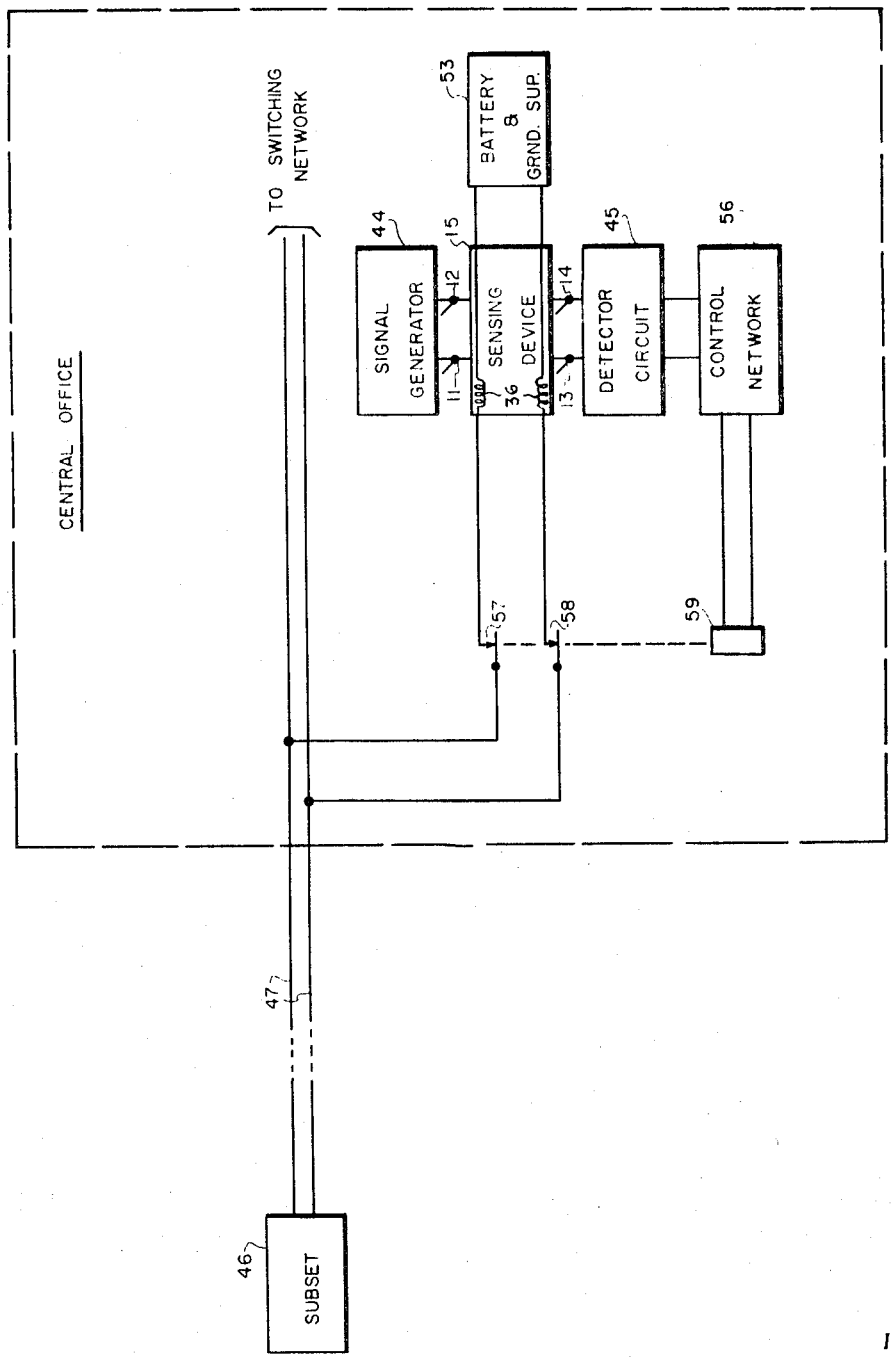
FIG. 1 is a schematic representation of apparatus for monitoring telephone line circuits.

Referring now to the drawings, FIG. 1 is a schematic representation of a telephone line circuit showing how the monitoring apparatus of the present invention can be used to monitor the status of subscriber lines. The apparatus includes a sensing device 15, a signal generating source 44, a detecting circuit 45 and associated control elements.

Figure 2:
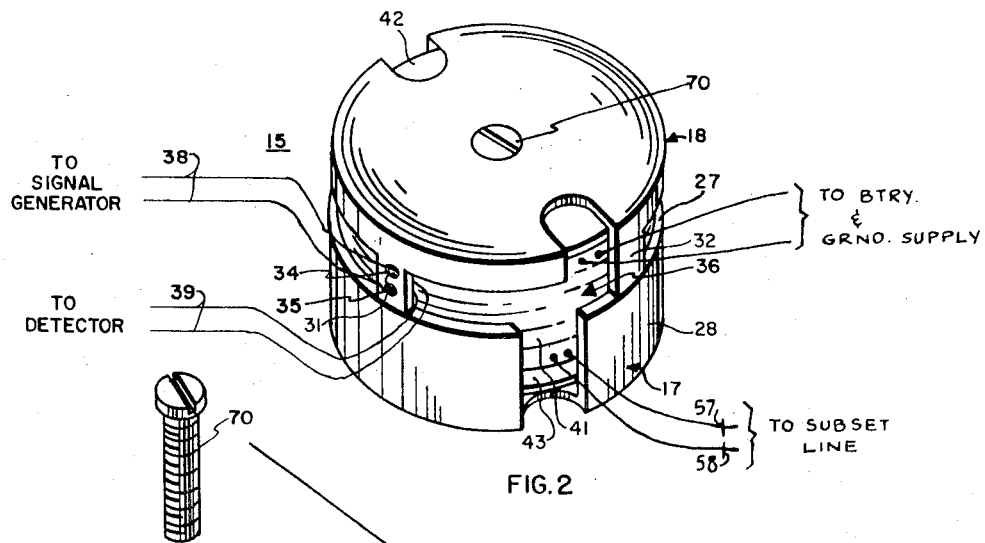
FIG. 2 is a perspective view of one embodiment of the magnetic sensing device of the present invention.

The sensing device, shown in FIG. 2, consists of a two-piece magnetic structure, 17 and 18, commonly refered to as a cup core, a control winding 36, and a pair of conductive loops 38 and 39 which thread a pair of apertures 34 and 35 formed in a portion of the magnetic structure. The two-piece structure is held together by means of a nut 71 and bolt 70, both made of a non-magnetic material.

Figure 3:
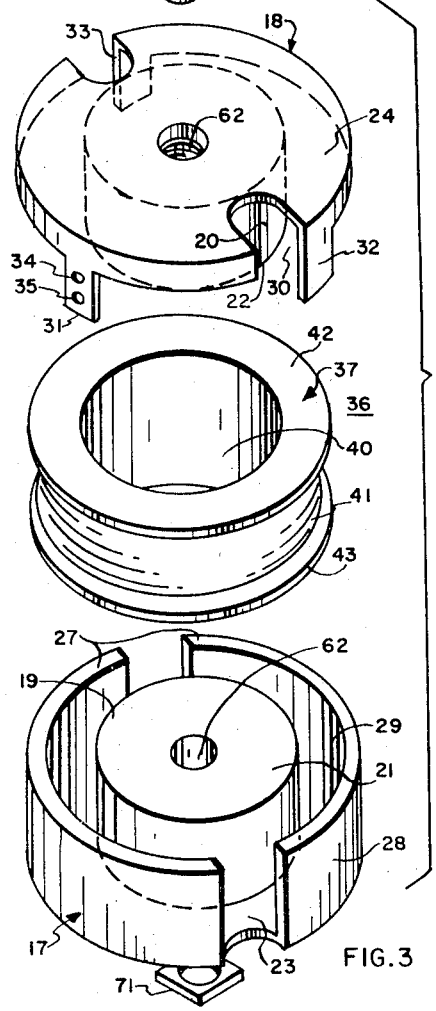
FIG. 3 is an exploded view of the sensing device of FIG. 2.

In the exploded view of the device, shown in FIG. 3, the magnetic structure is seen to consist of complementary parts 17 and 18, both preferably made of a linear ferrite material. Part 17 comprises a cylindrical central magnetic core 19, an integral base 23 and outer side walls 28. The side walls are spaced from the core to provide an annular channel 29 between the walls and core. Part 18 includes a cylindrical central magnetic core 20, a circular base 24, and circumferentially spaced legs 31, 32, and 33 which are integral with and depend from base 24. The legs are spaced from the core to form a generally annular channel 30, which is complementary to the channel 29 in part 17. A pair of apertures 34 and 35 have been drilled in leg 31.

The control winding 36, which in the preferred embodiment comprises a pair of separate sections, is advantageously wound on a coil form 37 to permit more flexibility in the assembly of the sensing device, and is covered with a piece of insulative tape 41. The circular coil form, which includes an opening 40 and a pair of flanges 42 and 43, is adapted for fitting around the cores 19 and 20 and being received in annular channels 29 and 30 formed in the magnetic structure. The diameter of the opening 40 is larger than the outer diameter of the cores 19 and 20, and the width of each of the flanges 42 and 43 is narrower than the widths of the channels 29 and 30 in the magnetic structure. The axial length of the coil form is less than the combined lengths of the cores 19 and 20 so that when the device is assembled, the control winding is contained substantially within the magnetic structure.

Referring again to FIG. 2, when the sensing device is assembled, the three legs 31, 32 and 33 of part 18 rest on an upper surface 27 of the outer side walls 28 of part 17. The faces 21 and 22 of the cores 19 and 20 abut so as to provide a substantially complete magnetic path.

The number of turns in the control winding depends upon the ferrite material used for the magnetic structure and on the magnitude of the current to be monitored. The number of control turns must be sufficient that a saturation flux is created in the magnetic structure whenever the current in the monitored circuit exceeds a predetermined value.

According to the invention, the magnetic structure provides two perpendicular non-remanent flux paths, each closed within the structure itself. The first flux path includes the cores 19 and 20, the sides 28, the legs 31, 32 and 33, and the bases 23 and 24. The second flux path exists around apertures 34 and 35 in leg 31.

This apparatus may be used to monitor the flow of current, preferably direct current, in a circuit. The monitoring function is accomplished by using the effect of magnetic saturation to decouple the ouput of a signal generating source and the input of a detector circuit.

The two sections of the control winding are serially connected to the circuit being monitored and, when energized, give rise to a flux in the first non-remanent flux path. The signal source and the detector circuit are connected to conductive loops 38 and 39, respectively, which thread the apertures 34 and 35 in leg 31. The conductive loop 38, when energized, gives rise to a flux in the second non-remanent flux path, and conductive loop 39 shares this flux. The signal generator is preferably a source of current pulses of alternating polarity; however, inasmuch as there is no remanent switching, a source that provides unipolar current pulses may be used. The detector may be one of the conventional detecting circuits known in the art.

The ferrite material in the vicinity of the apertures acts as a coupling medium, so that, whenever the magnetic structure is unsaturated, the signal from the signal source is inductively coupled to the loop connected to the detector circuit. If the current in the monitored circuit exceeds a predetermined magnitude, the magnetic structure becomes saturated and the signal source and the detector circuit are effectively decoupled. Thus, the presence or absence of an output from the detecting circuit is related to the magnitude of the current in the monitored circuit.

The use of a closed magnetic structure provides an efficient sensing operation inasmuch as nearly all of the flux generated by the current in the control winding is used to saturate the structure, and hence, the amount of material required for the sensing device is minimized. The efficiency of the device is further increased by virture of the fact that portions of the first flux path are constricted due to the configuration of the legs 30, 31, and 32, and hence, there is a concentration of flux in the legs. Because of this, the legs will tend to saturate before other portions of the magnetic structure.

By employing orthogonal flux fields, the magnetic sensing device, according to the invention, exhibits a high signal-to-noise ratio. This characteristic is desired when the device is used to monitor a circuit which may exhibit a wide range of current levels. More particularly, the two orthogonal flux fields are created by conductive loops which lie in a plane that is perpendicular to the plane of the control winding. Because of the orthogonal relationship of the flux field, there is no electromagnetic or electrostatic coupling between the control windings and the conductive loops; that is, there is no conventional or transformer type magnetic coupling present.

Figure 4:
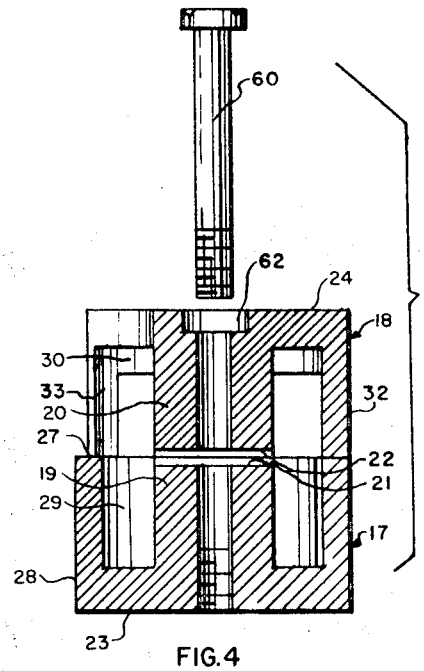
FIG. 4 is a sectional view of a preferred embodiment of the invention.

In the preferred embodiment of the invention, shown in a sectional view in FIG. 4, an air gap is provided between the faces 21 and 22 of cores 19 and 20, and a threaded ferrite tuning slug 60, substituted for bolt 70, which is received in an opening 62 in the center core portions of the magnetic structure for bridging the air gap by engaging threading provided in the lower end of the opening 62 in core 19. This substitution is used to alter the effect of the air gap, thereby permitting a change of the range of circuit current that the device can monitor. This altering of the air gap also permits the use of wider tolerances in the production of the control winding and the manufacturing of the magnetic structure.

Referring again to FIG. 1, the described magnetic sensing device is advantageously employed in a telephone switching system to monitor the "on-hook" or "off-hook" status of subscriber lines. Each subscriber station, only one of which has been shown, in the system has a subset 46 which is connected to the central office via a pair of line conductors 47. A sensing device 15 is provided for each line in the telephone system, and the devices are arranged in a matrix array to facilitate the monitoring function.

The two separate sections of the control winding 36 of sensing device 15 are serially connected between a battery and ground supply 53 and the subset 46. The response characteristic of the sensing element is such that whenever the subscriber lifts the handset of his subset, line current, sufficient to cause saturation of the magnetic structure, flows in the conrtol windings. The sensing device is designed so that a saturation magnetization will be created whenever the line current exceeds a particular value in a predetermined range. The lower limit of the current range is based on the maximum conductor resistance and the minimum exchange battery potential. The use of a tunable sensing device permits the range to be adjusted to include a lower value of line current or to raise the value of threshold current.

The sensing device acts as a gating circuit and decouples the signal generating source 44 from the detector circuit 45 whenever the magnetic element is saturated. The output of the detector circuit 45 is monitored and the presence or absence of output on this winding is indicative of the "on-hook" or "off-hook" status of a subscriber's line. Both the signal generator and the detector circuit are connected to commutated terminal pairs 11, 12 and 13, 14 respectively. An indication from the detector circuit, in response to the flow of line current in the control winding, that the subscriber requires service will cause the control network 56 to supply dial tone over the line conductors 47 and to activate relay 59 thereby opening contacts 57 and 58 and removing the sensing device from the transmission path.

The above arrangement has been described with reference to a preferred embodiment of the invention. It should be noted, however, that numerous alternations and modifications may be devised by those skilled in the art without departing from the spirit and scope of the invention. For example, although the sensing device according to the invention has been described with respect to preferred embodiments, it should be understood that the magnetic structure could be fabricated in various shapes other than a cup core; also other types of magnetic material could be used.

What is clamed is:

1. Apparatus for monitoring the current flow in a circuit, comprising: a magnetic structure providing two substantially perpendicular non-remanent flux paths, each substantially closed within said magnetic structure; a control winding contained substantially within said structure in one plane for giving rise to a flux in the first of said paths, when energized; and control winding being adapted for connection in said circuit and operative to saturate said magnetic structure upon the flow of current through said circuit, two conductive loops wound on said structure in a plane substantially perpendicular to said first plane so as to share the flux in the second of said paths; a first and a second conductor respectively connected to said two loops; signal generating means connected to said first conductor for energizing the first loop to induce a signal in said loop in the absence of said saturation of said magnetic structure; sensing means connected to said second conductor for detecting said signal; said magnetic structure comprising first and second portions; said first portion including a magnetic core surrounded by said control winding; said second portion providing a substantially complete magnetic return path around said magnetic core and said control winding; and said second portion including a plurality of legs extending parallel to said first portion, one of said legs having a pair of apertures formed therein through which said conductive loops are threaded.

2. Current monitoring apparatus according to claim 1, wherein said second portion comprises two coaxial substantially cup-shaped members having cylindrical portions which abut each other at their open ends, one of said cylindrical portions having cutouts therein adjacent said ends to form said plurality of legs, whereby said first-path flux between said members is concentrated in said legs.

3. Current monitoring apparatus according to claim 1, wherein said first portion includes first and second core portions normally spaced apart from one another so as to provide an air gap therebetween; and wherein means is provided for bridging said air gap to alter the effect thereof, whereby said apparatus is adjusted to monitor a different range of current flowing through said circuit.

References Cited

UNITED STATES PATENTS 3,268,878  8/1966  Lohan.
3,138,720  6/1964  Glore.

KATHLEEN H. CLAFFY, Primary Examiner

T. W. BROWN, Assistant Examiner